(12) United States Patent
Caritey et al.

(10) Patent No.: US 7,946,343 B2
(45) Date of Patent: May 24, 2011

(54) VERSATILE ADDITIVES FOR WELL CEMENTING APPLICATIONS

(75) Inventors: Jean-Philippe Caritey, Clamart (FR); Michel Michaux, Clamart (FR); Tatiana Pyatina, Clamart (FR); Frédéric Thery, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 350 days.

(21) Appl. No.: 12/091,515

(22) PCT Filed: Oct. 23, 2006

(86) PCT No.: PCT/EP2006/010204
§ 371 (c)(1),
(2), (4) Date: Aug. 22, 2008

(87) PCT Pub. No.: WO2007/048560
PCT Pub. Date: May 3, 2007

(65) Prior Publication Data
US 2008/0318811 A1    Dec. 25, 2008

(30) Foreign Application Priority Data
Oct. 25, 2005   (EP) .................................... 05292259

(51) Int. Cl.
*E21B 33/14* (2006.01)
(52) U.S. Cl. ........................ 166/293; 507/207; 507/273
(58) Field of Classification Search .................. 166/285, 166/292, 293, 305.1; 507/216, 219
See application file for complete search history.

(56) References Cited

U.S. PATENT DOCUMENTS

| | | | |
|---|---|---|---|
| 3,682,669 A * | 8/1972 | Later et al. | 106/766 |
| 3,754,953 A * | 8/1973 | Martin | 106/696 |
| 4,131,578 A * | 12/1978 | Crinkelmeyer et al. | 524/2 |
| 4,452,635 A * | 6/1984 | Noshi et al. | 106/628 |
| 4,548,270 A | 10/1985 | Eilers | |
| 4,871,395 A | 10/1989 | Sugama | |
| 4,997,487 A * | 3/1991 | Vinson et al. | 106/804 |
| 5,556,458 A * | 9/1996 | Brook et al. | 106/708 |

FOREIGN PATENT DOCUMENTS

| | | | |
|---|---|---|---|
| FR | 2667058 | | 3/1992 |
| GB | 2405636 | | 3/2005 |
| GB | 2405636 A | * | 3/2005 |
| WO | WO96/22245 | | 7/1996 |
| WO | WO2005/024175 | | 3/2005 |

* cited by examiner

*Primary Examiner* — Randy Gulakowski
*Assistant Examiner* — Jeffrey Washville
(74) *Attorney, Agent, or Firm* — David Cate; Robin Nava; Jeffrey Griffin

(57) ABSTRACT

The present invention provides a versatile additive for improving the properties of a cement slurry made with portland cement and to be utilized in well cementing, said versatile additive comprising type of silicates and/or borates that inhibit gelation occurring with the interstitial phase. The additive of the present invention improves significantly the rheology (i.e., strong dispersing effect) and can even overcome severe gelation problems. At temperature above about 88° C. (190° F.) the additive acts as retarder aid, enabling to reduce considerably the concentration of retarder required to achieve a given thickening time.

18 Claims, 3 Drawing Sheets

VERSATILE ADDITIVES FOR WELL CEMENTING APPLICATIONS

FIELD OF THE INVENTION

The present invention broadly relates to well cementing. More particularly the invention relates to an additive for cement composition and related method of cementing.

DESCRIPTION OF THE PRIOR ART

Cement slurries for use in oil well cementing operations are typically based around Portland cement as a hydraulic binder. The setting of such cement, known as hydration, is a chemical reaction between the water present in the slurry and the cement material, the reaction causing the slurry to first gel and then set solid as it progresses over time. In use, a pumpable slurry of cement, water and other solid and or liquid additives is prepared at the surface.

It is particularly difficult to delay the hydration of Portland cements at elevated temperatures, and powerful retarders have been developed. However they can produce unpredictable results because the thickening time of cement slurry, and the time at which the compressive strength of cement begins to develop, are very sensitive to retarder concentration. Moreover, the upper temperature limit of these retarders sometimes is too low for cementing high-temperature wells. So, the addition of a retarder enhancer often is required. Sodium borate salts (e.g., borax) and boric acid are known to be effective "retarder enhancers". However these chemicals are not always compatible with some other high-temperature additives and, therefore, may impair the fluid-loss control and rheology of cement slurries.

FR 2,667,058 describes the use of silicates in retarded cement slurries in tie-back applications (i.e. when it is desired that the cement sheath extends all the way from the bottom of the well to the surface). In this application, a glucoheptonate retarder is used to retard set of the cement under the bottomhole conditions of higher temperatures and relatively large quantities (17.75 L/tons of cement) of sodium silicate are included in the slurry to bring about set at the surface, which is at a much lower temperature.

Patent application WO2005/024175 describes the use of silicates as a retarder enhancer at higher and lower temperatures. The amount of silicates added was nevertheless not controlled. And the retarder applies only for well cementing slurry, useless for example for construction cementing slurry, so not appropriate on variability of cement.

This problem of variability of cement reactivity is regularly encountered in well cementing. The reactivity of a cement will establish how quickly a cement will set. In order to assist in cement job design, a series of cement classifications have been established which indicate the general level of reactivity of cement and suitability for certain applications of well cementing. One such classification is that of the American Petroleum Institute (API) which provides classifications A-H for cements suitable for well cementing, those cementing system will be called oilfield cement composition. However, cements meeting such classifications are often relatively expensive. Construction cements are often cheaper and more readily available in many parts of the world than API cements, those cementing system for construction will be called construction cement composition. However, their variable reactivity and unreliable behavior makes their use in well cementing applications risky specifically when the temperature is increasing, since there is often the chance that the slurry will set too quickly or not at all. When taken with the effects of temperature at the bottom and top of a well, and the unreliable nature of the effects of additives such as retarders, the use of these cements, while economically desirable, is considered unacceptably risky. At present, there is no easily implements way to control the setting properties of such cements so as to be able to render them useful for well cementing uses.

Hence, it remains the need to provide methods and compositions for retarding cement set which address the problem of variability of cement reactivity. It is an object of the invention to provide this additive for every type of cement compositions including oilfield and construction cementing compositions.

SUMMARY OF THE INVENTION

The present invention provides a versatile additive for improving the properties of a cement slurry made with portland cement and to be utilized in well cementing, said versatile additive comprising type of silicates and/or borates that inhibit gelation occurring with the interstitial phase. The additive of the present invention improves significantly the rheology (i.e., strong dispersing effect) and can even overcome severe gelation problems. At temperature above about 88° C. (190° F.) the additive acts as retarder aid, enabling to reduce considerably the concentration of retarder required to achieve a given thickening time.

Preferably, the additive comprises alkali silicates of the general formula $(SiO_2)_x(M_2O)$, wherein M is an alkali metal, to the slurry. Further, the silicates have the property of releasing polysilicates anions. It seems that alkali silicates, which release some polysilicate anions in aqueous solution, decrease the hydration rate of the interstitial phase of portland cements. Polysilicate anions are present in large quantities in aqueous solution when the $SiO_2:M_2O$ (M is Na or K) molar ratio of silicate is equal or above 1.5. A solid sodium silicate with a $SiO_2:Na_2O$ molar ratio of 3.32 was shown to be much more effective than sodium metasilicate ($Na_2SiO_3$, $SiO_2:Na_2O$ molar ratio of 1) that is currently used in the field when liquid additives cannot be used. This silicate must be partially hydrated to increase its dissolution rate in cement slurry. Preferably, the $SiO_2:Na_2O$ molar ratio is in the range 1.68-3.37.

Preferably, the additive comprises alkali borates of the general formula $(B_2O_3)_y(N_2O)$, wherein N is an alkali metal, to the slurry. Further, the borates have the property of releasing polyborates anions. It seems that alkali borates, which release some polyborate anions in aqueous solution, decrease the hydration rate of the interstitial phase of portland cements. Polyborates anions are present in large quantities in aqueous solution when the $B_2O_3:N_2O$, (M is Na or K) molar ratio of borate is equal or above 2. Preferably, the $B_2O_3:N_2O$ molar ratio is in the range 2-5.

In another aspect of the invention, the invention provides use of the versatile additive as described above with a retarder comprising at least one of the components chosen in the list constituted of: gluconate salts, glucoheptonate salts, hydroxycarboxylic acids, hydroxycarboxylic salts, mixtures of hydroxycarboxylic acids and/or salts and lignosulphonates, mixtures of hydrocarboxylic acids and/or salts and lignin amine derivatives, unrefined and refined lignosulphonates.

In another aspect of the invention, the invention provides a method of preparing a cement slurry made with portland cement and to be utilized in well cementing, said method comprises: (i) providing an hydraulic cement made with portland cement; and (ii) combining a versatile additive as described above with said hydraulic cement in an amount in the range of from about 0.1% to about 20% by weight of said hydraulic cement in said slurry. Preferably the method further comprises adding a retarder comprising at least one of the components chosen in the list constituted of: gluconate salts, glucoheptonate salts, hydroxycarboxylic acids, hydroxycarboxylic salts, mixtures of hydroxycarboxylic acids and/or salts and lignosulphonates, mixtures of hydrocarboxylic acids and/or salts and lignin amine derivatives, unrefined and refined lignosulphonates.

In another aspect of the invention, the invention provides a method for cementing a subterranean zone penetrated by a well bore at a temperature above about 88° C. (190° F.) utilizing a cement slurry made with portland cement, said method comprises: (i) providing an hydraulic cement made with portland cement; (ii) combining a versatile additive as described above with said hydraulic cement in an amount in the range of from about 0.1% to about 20% by weight of said hydraulic cement in said slurry; (iii) pumping said slurry containing said versatile additive formed previously into the subterranean zone by way of said well bore; and (iv) allowing said slurry to set. Preferably the method further comprises adding a retarder comprising at least one of the components chosen in the list constituted of: gluconate salts, glucoheptonate salts, hydroxycarboxylic acids, hydroxycarboxylic salts, mixtures of hydroxycarboxylic acids and/or salts and lignosulphonates, mixtures of hydrocarboxylic acids and/or salts and lignin amine derivatives, unrefined and refined lignosulphonates.

BRIEF DESCRIPTION OF THE DRAWINGS

Further embodiments of the present invention can be understood with the appended drawings.

DETAILED DESCRIPTION

Oilfield Cement Compositions

Figure 1:
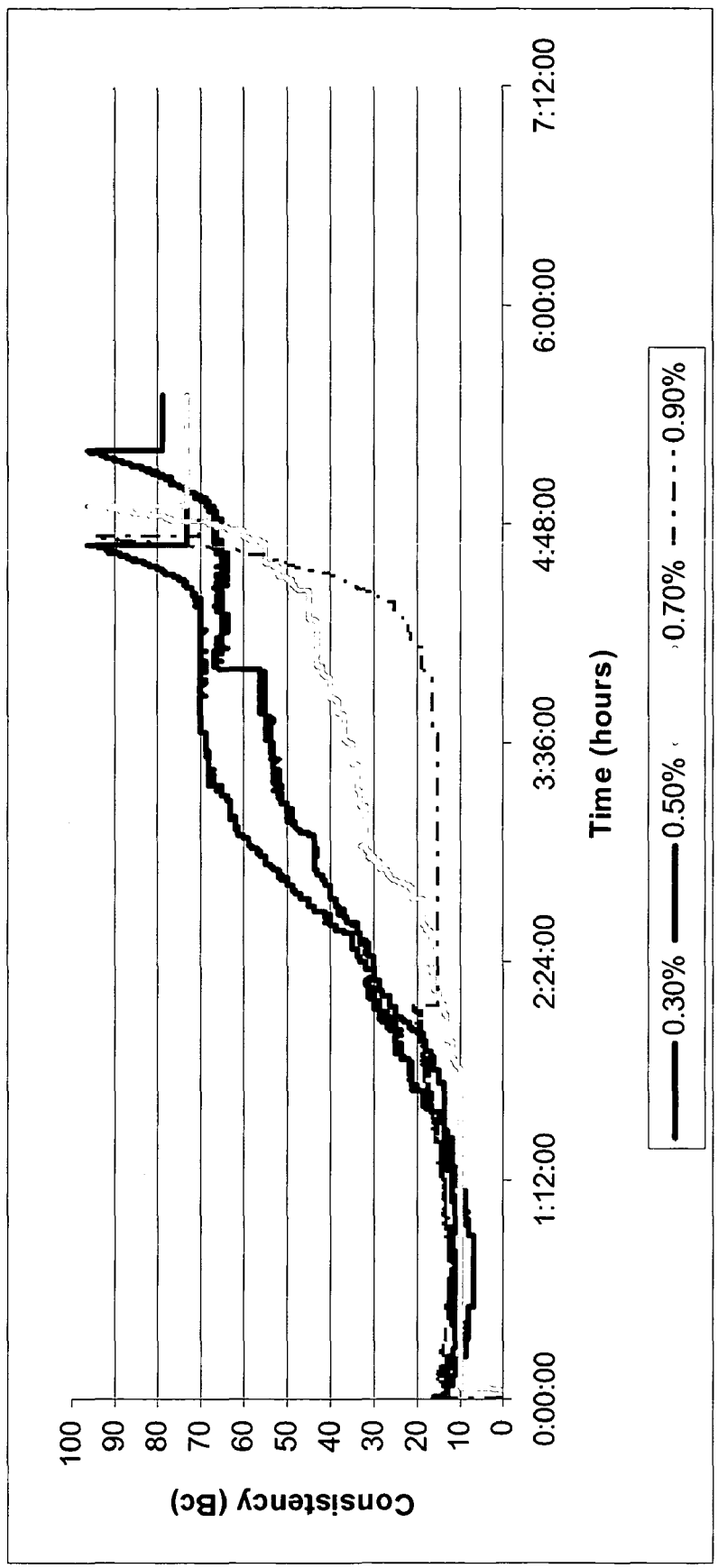
FIG. 1 shows a graph on thickening times at 93° C. with a construction cement composition and versatile additive.

Versatile additives of the type of sodium silicates are tested. The effect of three different sodium silicates on the rheology and thickening time of two class G cement (American Petroleum Institute classification) slurries retarded with two different lignosulfonate retarders has been studied at elevated temperature.

The features of the three sodium silicates are reported in Table 1. Silicates 1 and 2 (sodium metasilicate) are under solid form and silicate 3 is under concentrated liquid form (glass water). The $SiO_2$:$Na_2O$ molar ratio is 3.32 for silicate 1, 1 for silicate 2 (sodium metasilicate, $Na_2SiO_3$) and 3.37 for silicate 3. Silicate 1 contains 19 wt % of crystallization water, while silicate 2 is in anhydrous form.

TABLE 1

| Sodium silicates composition | | | | |
|---|---|---|---|---|
| Silicate | Form | $SiO_2$ (wt %) | $Na_2O$ (wt %) | $SiO_2$:$Na_2O$ molar ratio |
| 1 | Solid* | 61.8 | 19.2 | 3.32 |
| 2 | Solid | 49.2 | 50.8 | 1 |
| 3 | Liquid | 29.5 | 9.0 | 3.37 |

*this solid sodium silicate contains 19 wt % of water

The two class G cements, oilfield cement composition, are supplied by Dyckerhoff™ and are labeled as "Black Label", which will be called cement A and "Red Label", which will be called cement B. The two retarders are lignosulfonates. Retarder 1 is an unrefined lignosulfonate that contains some residual sugars, mainly pentoses and hexoses, and corresponding aldonic acids such as xylonic acid. Retarder 2 is a refined lignosulfonate for which the residual sugars have been removed during the manufacturing process.

The G cement was mixed with tap water at 1.89 kg/L (15.8 lbm/gal) density. An antifoam agent (2.66 liters per ton of cement) was added to the mix water to prevent excessive formation of foam during the mixing of cement slurry. Silicate 1 or 2 and the retarder were dry blended with the cement, whereas silicate 3, that is a liquid, was added to the mix water. Silica flour (35% by weight of cement, BWOC) was dry blended with the cement for slurry designs at Bottom Hole Circulating Temperature (BHCT) of 104.4° C. (220° F.) in order to prevent the "strength retrogression" effect experienced when the Bottom Hole Static Temperature (BHST) is above 110° C. (230° F.). In most cases the BHST is higher than the BHCT. Cement slurries were mixed according to the API specification. The cement is added within 15 seconds to the mix water in the Waring blender rotating at 4,000 RPM. The slurry is then mixed for 35 seconds at 12,000 RPM. The amounts of materials are calculated to obtain 600 mL of slurry. The rheology was measured with a Chan 35 rheometer after conditioning of cement slurry for 20 minutes at 85° C. (185° F.) in an atmospheric consistometer rotating at 150 RPM. The slurry was sheared at different shear rates corresponding to rotation speeds of 300, 200, 100, 60 and 30 RPM. Readings are reported in Tables 3, 4 and 6. The thickening time was measured in a pressurized consistometer rotating at 150 RPM. The schedules used for these tests are reported in Table 2. The thickening time value corresponds to the time necessary to reach a slurry consistency of 100 Bearden units, corresponding to the beginning of cement set. Results are reported in Tables 5 and 7.

TABLE 2

| Schedules for thickening time tests reported in Tables 5 and 7 | | | | | |
|---|---|---|---|---|---|
| Initial Temperature (° C.) | Final Temperature (° C.) | Initial Pressure | Final Pressure (psi) | Time to T/P (min.) | Heating Rate (° C./min.) |
| 27 | 85 | 10 MPa (1500 psi) | 70 MPa (10200 psi) | 44 | 1.32 |
| 27 | 93.3 | 12 MPa (1750 psi) | 92 MPa (13400 psi) | 52 | 1.27 |
| 27 | 104.4 | 12 MPa (1750 psi) | 92 MPa (13400 psi) | 52 | 1.49 |

TABLE 3

Effect of Silicate 1 on the rheology of cement
slurries retarded with 0.3% BWOC Retarder 1

| Rheology at 85° C.: | Silicate 1 (% BWOC) | | | | |
|---|---|---|---|---|---|
| | 0 | 0.1 | 0.2 | 0.3 | 0.5 |
| 300 RPM | 124 | 93 | 68 | 55 | 49 |
| 200 RPM | 120 | 88 | 62 | 49 | 43 |
| 100 RPM | 116 | 78 | 56 | 44 | 37 |
| 60 RPM | 101 | 72 | 53 | 42 | 35 |
| 30 RPM | 65 | 52 | 43 | 36 | 30 |

Cement A mixed with fresh water at 1.89 kg/L density
Cement slurries contain 2.66 liters of antifoam agent per ton of cement Table 3 shows the effect of silicate 1 ($SiO_2:Na_2O$ molar ratio of 3.32) on the rheology of cement A slurries retarded with 0.3% BWOC of unrefined lignosulfonate. In the absence of silicate the readings are high, indicating that the slurry is not dispersed. A strong dispersing effect is noted with increased silicate concentration.

TABLE 4

Effect of Silicate 2 on the rheology of cement
slurries retarded with 0.3% BWOC Retarder 1

| Rheology at 85° C.: | Silicate 2 (% BWOC) | | | | |
|---|---|---|---|---|---|
| | 0 | 0.126 | 0.252 | 0.376 | 0.628 |
| 300 RPM | 124 | 130 | 109 | 112 | 119 |
| 200 RPM | 120 | 125 | 104 | 107 | 112 |
| 100 RPM | 116 | 113 | 96 | 101 | 103 |
| 60 RPM | 101 | 100 | 88 | 93 | 95 |
| 30 RPM | 65 | 65 | 62 | 63 | 68 |

Cement A mixed with fresh water at 1.89 kg/L density
Cement slurries contain 2.66 liters of antifoam agent per ton of cement Table 4 shows the effect of silicate 2 (sodium metasilicate, $SiO_2:Na_2O$ molar ratio of 1) on the rheology of cement A slurries retarded with 0.3% BWOC of unrefined lignosulfonate. The concentrations of silicate 2 were chosen to give the same concentrations of $SiO_2$ as for silicate 1 (Table 3). The strong dispersing effect obtained when adding the silicate 1 is no longer observed with silicate 2.

TABLE 5

Effect of Silicates 1, 2 and 3 on the thickening time of cement
slurries retarded with Retarder 1 at different temperatures

| Silica flour (% BWOC) | — | — | — | — | — | 35 | 35 | 35 | 35 |
|---|---|---|---|---|---|---|---|---|---|
| Retarder 1 (% BWOC) | 0.3 | 0.3 | 0.3 | 0.5 | 0.5 | 0.8 | 0.8 | 0.8 | 0.8 |
| Silicate 1 (% BWOC) | — | 0.3 | — | — | 0.3 | — | 0.3 | — | — |
| Silicate 2 (% BWOC) | — | — | 0.38 | — | — | — | — | 0.38 | — |
| Silicate 3 (L/ton) | — | — | — | — | — | — | — | — | 4.53 |
| Temperature (° C.) | 85 | | | 93.3 | | 104.4 | | | |
| Thickening Time | 4:44 | 4:36 | 2:47 | 6:22 | 9:11 | 3:49 | 7:17 | 4:33 | 23:20 |

Cement A mixed with fresh water at 1.89 kg/L density
2.66 liters of antifoam agent per ton of cement is added Table 5 shows the effect of different silicates on the thickening time of cement A slurries retarded with unrefined lignosulfonate at different temperatures. At 85° C. (185° F.) the thickening time of the slurry retarded with 0.3% BWOC of retarder is 4 hours and 44 minutes. The addition of 0.3% BWOC of silicate 1 does not change the thickening time (a difference of 8 minutes is not significant), whereas the addition of 0.38% BWOC of silicate 2 (same amount of $SiO_2$ as for silicate 1) shortens it considerably. Silicate 3 was not tested at this temperature. At 93.3° C. (200° F.) the thickening time of the slurry retarded with 0.5% BWOC of retarder is 6 hours and 22 minutes. This time is significantly lengthened when adding 0.3% BWOC of silicate 1. Silicates 2 and 3 were not tested at this temperature. At 104.4° C. (220° F.) the thickening time of the slurry retarded with 0.8% BWOC of retarder is only 3 hours and 49 minutes. As observed at 93.3° C. the thickening time is considerably lengthened when adding 0.3% BWOC of silicate 1. It is also lengthened when adding 0.38% BWOC of silicate 2, but to a much lesser extent (44 minutes against 208 minutes). The thickening time is dramatically increased (23 hours and 20 minutes) when adding 4.53 liters of silicate 3 per ton of cement. This concentration corresponds to the same concentration of $SiO_2$ as for the two other silicates (i.e., 0.185% BWOC $SiO_2$).

TABLE 6

Effect of Silicates 1, 2 and 3 on the rheology of
cement slurries retarded with Retarders 1 and 2

| | | | | | | |
|---|---|---|---|---|---|---|
| Retarder 1 (% BWOC) | 0.8 | 0.8 | 0.8 | 0.8 | — | — |
| Retarder 2 (% BWOC) | — | — | — | — | 0.8 | 0.8 |
| Silicate 1 (% BWOC) | — | 0.3 | — | — | — | 0.3 |
| Silicate 2 (% BWOC) | — | — | 0.38 | — | — | — |
| Silicate 3 (L/ton) | — | — | — | 4.53 | — | — |
| Rheology at 85° C.: | | | | | | |
| 300 RPM | 69 | 20 | 86 | 25 | 64 | 26 |
| 200 RPM | 55 | 13 | 77 | 16 | 60 | 17 |
| 100 RPM | 42 | 6 | 68 | 8 | 58 | 10 |
| 60 RPM | 38 | 4 | 64 | 5 | 52 | 6 |
| 30 RPM | 34 | 2 | 55 | 3 | 44 | 4 |

Cement B mixed with fresh water at 1.89 kg/L density
Cement slurries contain 2.66 liters of antifoam agent per ton of cement and 35% BWOC silica flour Table 6 shows the effect of the three silicates on the rheology of cement B slurries retarded with 0.8% BWOC of unrefined lignosulfonate (retarder 1). The slurry is fully dispersed (yield stress value close to zero) upon addition of 0.3% BWOC of silicate 1. A similar effect is noted when adding 4.53 liters of silicate 3 per ton of cement. On the contrary the slurry becomes more viscous (higher readings) when adding 0.38% BWOC of silicate 2. The strong dispersing effect of silicate 1 is also observed when the slurry is retarded with 0.8% BWOC of refined lignosulfonate (retarder 2). The other two silicates were not tested with this retarder.

TABLE 7

Effect of Silicates 1, 2 and 3 on the thickening time
of cement slurries retarded with Retarders 1 and 2

| | | | | | | |
|---|---|---|---|---|---|---|
| Retarder 1 (% BWOC) | 0.8 | 0.8 | 0.8 | 0.8 | — | — |
| Retarder 2 (% BWOC) | — | — | — | — | 0.8 | 0.8 |
| Silicate 1 (% BWOC) | — | 0.3 | — | — | — | 0.3 |
| Silicate 2 (% BWOC) | — | — | 0.38 | — | — | — |

TABLE 7-continued

Effect of Silicates 1, 2 and 3 on the thickening time
of cement slurries retarded with Retarders 1 and 2

| Silicate 3 (L/ton) | — | — | — | 4.53 | — | — |
|---|---|---|---|---|---|---|
| Thickening time at 104.4° C. | 2:49 | 3:37 | 2:29 | 10:35 | 2:02 | 3:16 |

Cement B mixed with fresh water at 1.89 kg/L density
Cement slurries contain 2.66 liters of antifoam agent per ton of cement and 35% BWOC silica flour Table 7 shows the thickening times at 104.4° C. (220° F.) corresponding to these cement B slurries. It is noted that thickening times obtained with cement B are significantly shorter than those obtained with cement A (shown on Table 5). The addition of 0.3% BWOC of silicate 1 lengthens the thickening time by 48 minutes when the slurry is retarded with unrefined lignosulfonate (retarder 1) and by 74 minutes when it is retarded with refined lignosulfonate (retarder 2). The thickening time is slightly shorter when adding 0.38% BWOC of silicate 2 to the slurry retarded with unrefined lignosulfonate. As observed with the other cement the strongest retarding effect is noted when adding 4.53 liters of silicate 3 per ton of cement.

The inventors have noted that the performance of sodium silicate depends on the chemistry of silicate. Effectively, three different behaviors have been experienced: (1) for Silicate 1, a strong dispersing effect, a moderate retarding effect at 93.3 and 104.4° C. (no effect at 85° C.); (2) Silicate 2, no dispersing effect (when the silicate is dry blended with the cement), no retarding effect at 93.3 and 104.4° C. (accelerating effect at 85° C.); (3) Silicate 3, a strong dispersing effect, a strong retarding effect at 104.4° C. (not tested at 85 and 93.3° C.).

So, inventors assume that there are two key parameters; the $SiO_2:Na_2O$ ratio, and the physical state of silicate (i.e., used as a concentrated liquid or as a solid). Behind these two parameters the degree of polymerization of silicate anions in aqueous solution plays an important role: —if the $SiO_2:Na_2O$ molar ratio of silicate is high (e.g., silicate 3) polysilicate anions are present in solution; if this silicate is diluted in large quantities of water, as in the mix water to prepare the cement slurry, silicate anions remain under polymeric form for some time; —if the $SiO_2:Na_2O$ molar ratio of silicate is low (e.g., sodium metasilicate) monosilicate ions are present in solution; —a mixture of polysilicate and monosilicate anions may be obtained when a solid silicate with high $SiO_2:Na_2O$ molar ratio (e.g., silicate 1) is dissolved in large quantities of water.

It is assumed that polysilicate anions act as selective retarder for the interstitial phase of Portland cements. In the case of class G cements the interstitial phase is primarily composed of tetracalcium aluminoferrite (12-15% of cement), $Ca_4Al_2Fe_2O_{10}$, and small amount (<3%) of tricalcium aluminate, $Ca_3Al_2O_6$. The reactivity of the interstitial phase is rather high and, moreover, the hydration rate may be increased in the presence of some additives such as lignosulfonates. The hydration products formed from the interstitial phase absorb large quantities of organic molecules (dispersant, retarder) that are no longer available to disperse and retard the cement slurry. It is known that the rheology of cement slurries is a function of the reactivity of the interstitial phase. For instance higher concentrations of both dispersant and retarder are required when increasing the amount of tricalcium aluminate, which is the most reactive phase of Portland cements at early ages.

In the presence of some alkali silicates, releasing large quantities of polysilicate anions into the solution, the hydration extent of the interstitial phase could be lower. Consequently the amount of lignosulfonate molecules absorbed into its hydration products is smaller and, therefore, the slurry should be better dispersed. Previous study has shown that the beginning of cement set becomes controlled by the hydration of the interstitial phase when the curing temperature exceeds about 88° C. (190° F.). Below this temperature the cement set is primarily controlled by the hydration of silicate phases, $Ca_3SiO_5$ and $Ca_2SiO_4$. This could explain the longer thickening times obtained at 104.4° C. (220° F.) in the presence of silicates 1 and 3.

Construction Cement Compositions

Versatile additives of the type of sodium silicates and sodium borates are tested. The effect of three different sodium silicates and one sodium borate on the rheology and thickening time of various cement slurries retarded with two different retarders has been studied at elevated temperature.

The features of the sodium silicates and sodium borates are reported in Table 8. Silicates 1 and 2 (sodium metasilicate) are under solid form and silicate 3 is under concentrated liquid form (glass water). The $SiO_2:Na_2O$ molar ratio is 3.32 for silicate 1, 1 for silicate 2 (sodium metasilicate, $Na_2SiO_3$) and 3.37 for silicate 3. Silicate 1 contains 19 wt % of crystallization water, while silicate 2 is in anhydrous form.

TABLE 8

Versatile additives composition

| Additives | Form | $SiO_2$ (wt %) | $Na_2O$ (wt %) | Nature $SiO_2:Na_2O$ molar ratio |
|---|---|---|---|---|
| Silicate 1 | Solid* | 61.8 | 19.2 | 3.32 |
| Silicate 2 | Solid | 49.2 | 50.8 | 1 |
| Silicate 3 | Liquid | 29.5 | 9.0 | 3.37 |
| Borate 1 | Solid | * | * | Sodium pentaborate decahydrate |

*this solid sodium silicate contains 19 wt % of water

The cement slurries are made of three types of construction cements and one type of class A cement for oilfield application. Their properties are described in Table 9, C3A content corresponds to the tricalcium aluminate component of the interstitial phase.

TABLE 9

Cement compositions and properties

| Cements | | C3A content (%) | Fineness (cm²/g) |
|---|---|---|---|
| Cement C | Construction - ASTM Type I-II | 8 | 3300 |
| Cement D | Construction - Lafarge (TM) American cement | 7 | 3900 |
| Cement E | Construction - Holcim (TM) cement | 8 | 2800 |
| Cement F | Oilfield - Class A | 6 | 3000 |

All the slurries were prepared with fresh water, and an antifoam agent was also introduced (2.66 liters per ton of cement—0.03 gal/sk) to minimize an excessive foam generation during the mixing phase. A dispersant was also added to assure the right initial dispersion level. This dispersant is based on PolyNaphtaleneSulfonate components (PNS). Two different retarders were used, having different potential retardation capability. This was to take into account the operational need to adjust the thickening time as field conditions require. Retarders 3 and 4 are based on gluconate and glucoheptonate salts.

The results described in Table 10 confirm the dispersing properties of Silicate 1 with cement C type, which was already observed with Class G cement for oilfield application. Two cement compositions made of cement C are tested: C1 and C2. Addition of 0.5% BWOC of Silicate 1 decreases the rheology. The magnitude of this dispersing effect is related to the fineness of the cement, which is higher with this construction cement. This would induce the need to increase more Silicate 1 to get an equivalent dispersion.

TABLE 10

Cement C compositions and properties

| Formulation | C1 | C2 |
| --- | --- | --- |
| Retarder 4, % BWOC | 0.15 | 0.15 |
| Dispersant, % BWOC | 0.05 | 0.05 |
| Silicate 1, % BWOC | — | 0.5 |
| API (ramp down rheology) Rheology at 85° C. | | |
| 300 | 87 | 79 |
| 200 | 74 | 66 |
| 100 | 53 | 46 |
| 60 | 43 | 37 |
| 30 | 30 | 26 |
| 6 | 15 | 13 |
| 3 | 12 | 10 |

All formulations are 1.87 g/cm³ (15.6 lb/gal) slurries
Cement slurries contain antifoam agent at 2.66 liters per ton of cement (0.03 gal/sk)

The results in FIG. 1 show the comparative thickening times at 93° C. of slurries containing 0.2% BWOC of Retarder 3, 0.2% BWOC of dispersant, 2.66 liters of antifoam agent per ton of cement with varying concentrations of Silicate 1 (expressed in % BWOC). The slurry containing the lowest amount of Silicate 1 (0.3% BWOC) is a good example of gelation development with a significant increase of the consistency during the expected dormant period, and starting well before the 100Bc consistency. Moreover, the transit time between 30 and 100Bc is rather long. In term of application for cementing operations, this confirms that such a cement could not be used for slurries in cementing operation because it is not pumpable. On the other hand, the more silicate concentration is increased, the more the situation is getting better: the slurry containing up to 0.9% BWOC exhibits a consistency kept pretty low during the dormant period with no gelation development, and the transit time was shortened to reach a reasonable duration. The time to reach 100Bc is not so much affected.

This clearly shows the efficiency and the benefit of the adding and increasing of the amount of silicate. This is the confirmation that Silicate 1 behaves as an efficient gelation inhibitor, which allows to use such a standard construction cement (cement C) for oilfield operations.

TABLE 11

Comparison of versatile additives effect on cement D

| | Formulation | | | | | | |
| --- | --- | --- | --- | --- | --- | --- | --- |
| | D1 | D2 | D3 | D4 | D5 | D6 | D7 |
| Retarder 4, % BWOC | 0.1 | 0.1 | 0.15 | 0.15 | 0.15 | 0.15 | 0.15 |
| Silicate 1, % BWOC | — | 0.5 | — | 0.5 | — | — | — |
| Silicate 3, liter per ton | — | — | — | — | 3.2 | — | — |
| Silicate 2 wet, % BWOC | — | — | — | — | — | — | 0.315 |
| Silicate 2 dry, % BWOC | — | — | — | — | — | 0.315 | — |
| API (ramp down rheology) Rheology at 85° C. (185° F.) | | | | | | | |
| 300 | 250 | 247 | 44 | 71 | 49 | 178 | 40 |
| 200 | 240 | 238 | 38 | 60 | 39 | 174 | 30 |
| 100 | 223 | 205 | 29 | 47 | 26 | 155 | 19 |
| 60 | 186 | 160 | 19 | 42 | 22 | 155 | 15 |
| 30 | 140 | 114 | 15 | 35 | 18 | 110 | 12 |
| 6 | 76 | 60 | 14 | 20 | 13 | 50 | 8 |
| 3 | /68 | 48 | 11 | 15 | 10 | 35 | 7 |
| Thickening Time at 93° C. (200° F.) - API casing schedule 9.7 | | | | | | | |
| 100 Bc, hr:min | — | — | 3:29 | 4:15 | 4:18 | 1:34 | 3:58 |

All formulations are 1.87 g/cm³ (15.6 lb/gal) slurries
Cement slurries contain antifoam agent at 2.66 liters per ton of cement (0.03 gal/sk) and dispersant at 0.2% BWOC Table 11 shows a comparison of different silicates formulated to get the equivalent amount of $SiO_2$ in the slurry, with different concentration of Retarder 4. Seven cement compositions made of cement D are tested: D1 to D7. Formulations (D1 and D2) and (D3 to D7) show that dispersing properties can be within different order of magnitude with this type of cement D at that level of Silicate concentration. The main parameter is the cement fineness, which is the highest for that cement compared to the other presented cements. And because an elevated cement fineness directly induce an increased amount of additive, such cement could require an increased amount of gelation inhibitors.

But in that case, the contribution of these different gelation inhibitors does not impact mainly the rheology, but the thickening times to reach 100 Bc. All formulations (except formulation D6) induce a longer thickening time, which confirm their retarding properties through the development of polysilicates species. With formulation D7, the solid Silicate 2 was prehydrated, which has placed it in good conditions to generate some polysilicates species in mix water. On the other hand, when dry blended (Formulation D6), it is directly placed in front of the cement, and the initial monosilicate species can not generate polysilicates and so can not retard at all the formulation. Again what is observed is an adapted situation of the gelation inhibitor to the cement characteristics. There is a global equilibrium which is generated.

Composition cement made with cement E type has been tested with an versatile additive made of sodium borate with different concentration (expressed in % BWOC). This versatile additive includes in particular tetra and pentaborates with different hydration degrees. The cement composition slurry has a density of 1.87 g/cm³ (15.6 ppg), Retarder 4 at 0.1% BWOC, 0.2% BWOC of dispersant and 2.66 liters of antifoam agent per ton of cement are added. The results given in FIGS. 2 and 3, describe the influence of Borate 1.

Figure 2:
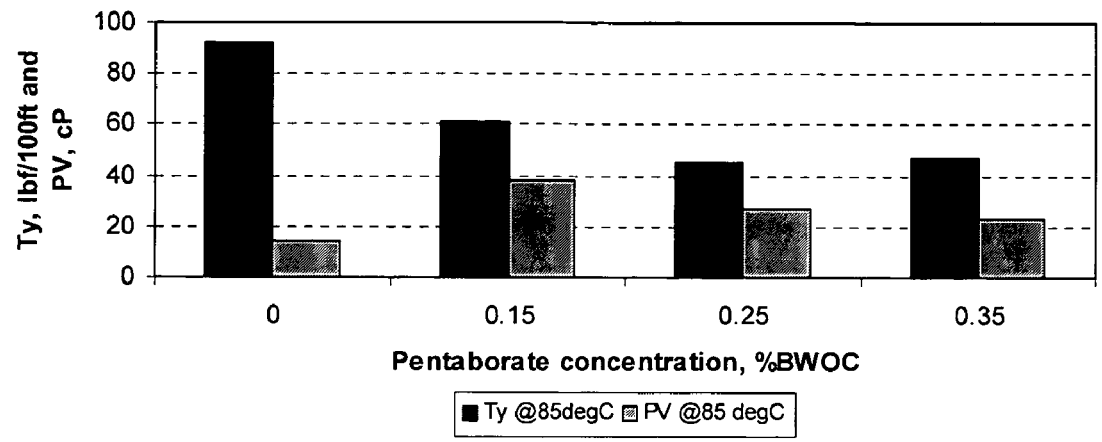
FIG. 2 shows a graph on rheology properties at 85° C. with a construction cement composition and versatile additive.
Figure 3:
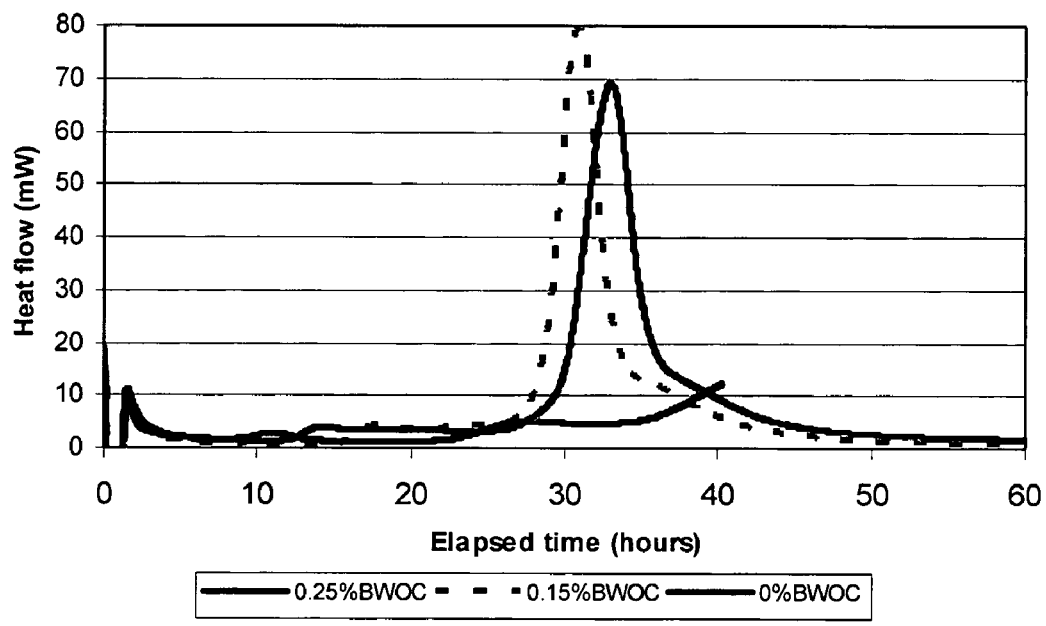
FIG. 3 shows a graph on calorimetry profiles at 85° C. with a construction cement composition and versatile additive.

FIG. 2 confirms the dispersing properties of the Borate 1 with a significant decrease of the rheology. The situation is enhanced when the Borate 1 concentration is increased. The hydration profiles of those formulations were also studied by calorimetry at 85° C. The profiles presented in the FIG. 3 show that Borate 1 exhibits retarding properties, when added in a sufficient amount to the reference slurry. This was observed with 0.25% BWOC. At 0.15% BWOC the difference with the reference formulation can be considered as negligible.

This combination of dispersing and retarding properties of Borate 1 indicate that this is a good gelation inhibitor for cement E.

TABLE 12

Comparison of versatile additives effect on cement E

| Formulation | F1 | F2 | F3 | F4 |
|---|---|---|---|---|
| Silicate 1, % BWOC | — | 0.5 | — | — |
| Silicate 2, % BWOC | — | — | 0.63 | — |
| Silicate 3, liter per ton | — | — | — | 3.2 |
| API (ramp down rheology) Rheology at 85° C. | | | | |
| 300 | 36 | 24 | 41 | 21 |
| 200 | 30 | 18 | 35 | 16 |
| 100 | 24 | 12 | 31 | 13 |
| 60 | 21 | 11 | 29 | 11 |
| 30 | 19 | 9 | 27 | 9 |
| 6 | 12 | 8 | 18 | 9 |
| 3 | 9 | 6 | 15 | 7 |

All formulations are 1.87 g/cm³ (15.6 lb/gal) slurries and 0.1% BWOC Retarder 4
Cement slurries contain antifoam agent at 2.66 liters per ton of cement (0.03 gal/sk) and dispersant at 0.2% BWOC Four cement compositions made of cement F are tested: F1 to F4. Table 12 shows the rheology results for the four cement compositions. The Silicates 1 and 3 which provide polysilicate species have a good dispersion property (Slurries F2 and F4). The Silicate 2 which provides monosilicate species has a lower dispersion property (Slurry F3) and does not have the equivalent performance.

Figure 4:
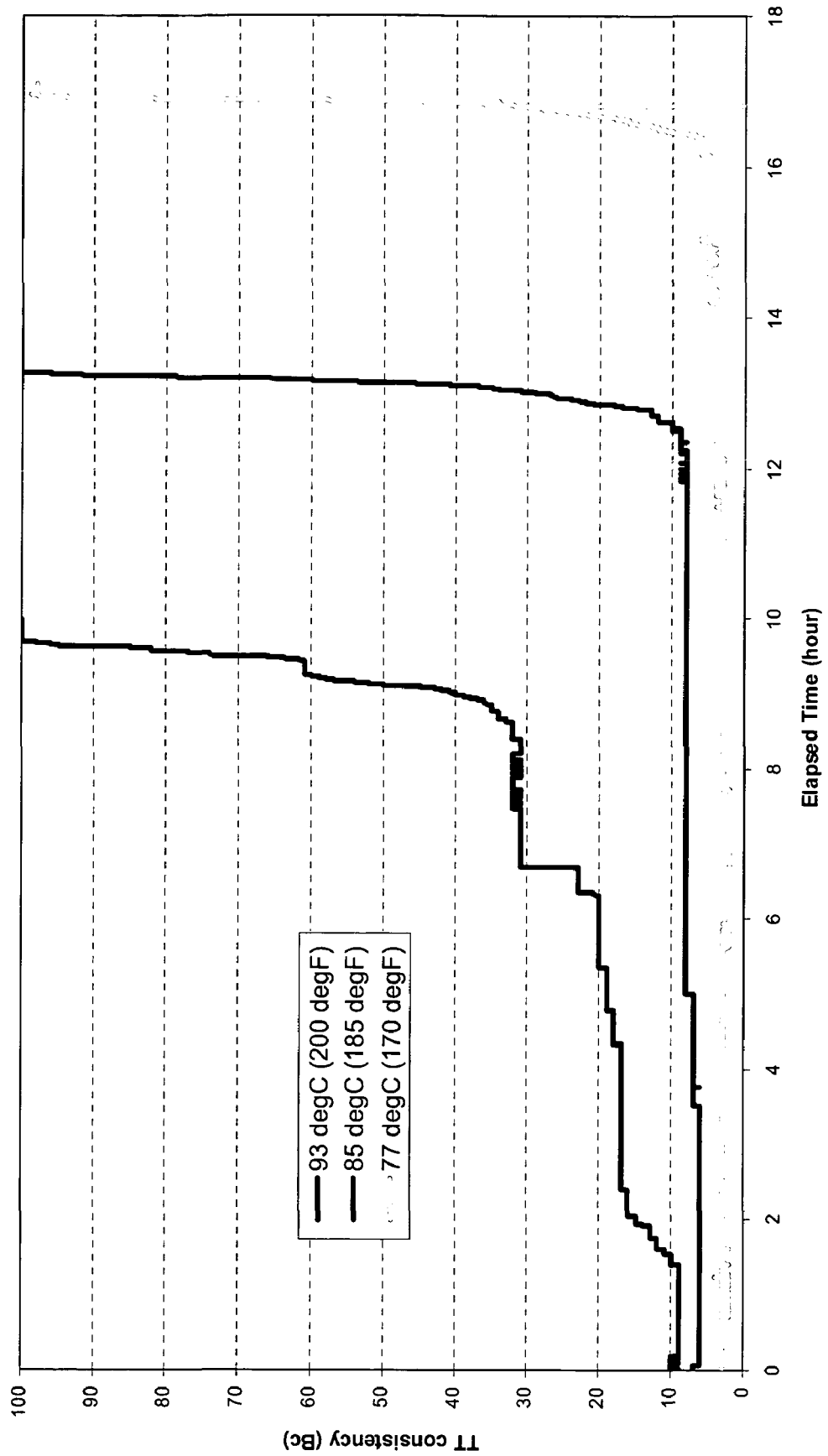
FIG. 4 shows a graph on thickening times at 77° C., 85° C. and 93° C. with a oilfield cement composition and versatile additive.

The thickening times presented in FIG. 4 show that temperature is also a parameter involved in the determination of the optimized amount of gelation inhibitor required. With this example, when temperature increases, interstitial phases become more and more reactive, and a cement, which could be considered as satisfactory at 77° C., would be no longer at 93° C., because a gelation development is observed. Generally, each situation would require a specific optimization taking into account all the essential parameters, which drive the gelation development (cement properties but also operational conditions like temperature).

In the same way, the inventors have noted that the performance of sodium silicate and borate depend on the chemistry of silicate and borate. The construction cement compositions have an interstitial phase (composed of $Ca_3Al_2O_6$ and $Ca_4Al_2Fe_2O_{10}$) containing high C3A content. As it has been observed some alkali silicates specifically retard the hydration of the interstitial phase of Portland cements for oilfield cement composition, while they do not retard the hydration of silicate phases. Now, it is observed by the inventors, the same results for some alkali silicates and alkali borates specifically retarding the hydration of the interstitial phase of Portland cements for oilfield and/or construction cement composition, while they do not retard the hydration of silicate phases. It is assumed that at temperature above about 88° C. (190° F.) the setting time becomes controlled by the hydration of interstitial phase. Consequently these alkali silicates and/or borates act as retarder aid at elevated temperatures, enabling to reduce significantly the concentration of retarder normally required to achieve a given thickening time.

In many cases gelation problems (i.e., early thickening of cement slurry) are attributed to higher hydration extent of the interstitial phase. The hydrates formed from this phase absorb large quantities of organic molecules (e.g., retarders, dispersants) that are no longer available in aqueous solution to retard and disperse the cement. Thus alkali silicates and/or borates, which are able to retard the hydration of the interstitial phase, behave as efficient anti-gelation agents.

The most effective alkali silicates are those releasing high proportions of polysilicate anions in aqueous solution. Actually the presence of polysilicate anions is enhanced when the $SiO_2:M_2O$ (M is Na or K) molar ratio is equal or above 1.5 and when the aqueous solution is concentrated. These two conditions are met with glass water that has a $SiO_2:Na_2O$ molar ratio of 3.37 and a solids content of 38.5 wt %. So glass water works properly both as a retarder aid at elevated temperatures and an anti-gelation agent.

A solid composition made with sodium metasilicate ($Na_2SiO_3$, $SiO_2:Na_2O$ molar ratio of 1), is recommended when liquid additives cannot be used for logistic reasons. However, this composition does not work properly because its aqueous solution is mainly composed of monosilicate anions. And it was shown that a solid sodium silicate with a $SiO_2:Na_2O$ molar ratio similar to that of glass water performs much better than sodium metasilicate. This solid silicate must not be under anhydrous form in order to increase its dissolution rate into the interstitial water of cement slurry when it is dry blended with the cement.

The most effective alkali borates are those releasing high proportions of polyborates anions in aqueous solution. Sodium tetraborates and sodium pentaborates are preferable.

The invention claimed is:

1. A method for inhibiting the occurrence of gelation occurring within the interstitial phase of Portland cement, the method comprising forming a Portland cement slurry and adding silicates, borates or both components to the slurry wherein:
    (i) the silicates have the property of releasing polysilicate ions, and the borates have the property of releasing polyborate ions; and
    (ii) the silicate concentration is between 0.1% and 0.9% by weight of Portland cement, and the borate concentration is between 0.1% and 0.35% by weight of Portland cement.

2. The method according to claim 1 further comprising adding a retarder comprising at least one of the components chosen in the list consisting of: gluconate salts, glucoheptonate salts, hydroxycarboxylic acids, hydroxycarboxylic salts, unrefined lignosulfonates, refined lignosulfonates and lignin amine derivatives.

3. The method according to claim 1, wherein the silicates are alkali metal silicates of the general formula $(SiO_2)_x(M_2O)$, wherein M is an alkali metal.

4. The method according to claim 3, wherein the $SiO_2:M_2O$ molar ratio is greater than 1.5.

5. The method according to claim 3, wherein the $SiO_2:M_2O$ molar ratio is in the range of from 1.68 to 3.37.

6. The method according to claim 1, wherein borates are included in alkali metal borates of the general formula $(B_2O_3)_y(N_2O)$, wherein N is an alkali metal, to the slurry.

7. The method according to claim 6, wherein the $B_2O_3:N_2O$ molar ratio is in the range of 2 to 5.

8. The method according to claim 7, wherein the $B_2O_3:N_2O$ molar ratio is equal to or greater than 2.

9. A method for controlling the rheological properties of a slurry comprising Portland cement, comprising:
   (i) providing an additive comprising silicates, borates or both, wherein the silicates have the property of releasing polysilicate ions, and the borates have the property of releasing polyborate ions; and
   (ii) combining the additive with the slurry, wherein the silicate concentration is between 0.1% and 0.9% by weight of Portland cement, and the borate concentration is between 0.1% and 0.35% by weight of Portland cement.

10. The method of claim 9, further comprising adding a retarder comprising at least one of the components chosen in the list consisting of: gluconate salts, glucoheptonate salts, hydroxycarboxylic acids, hydroxycarboxylic salts, unrefined lignosulfonates, refined lignosulfonates and lignin amine derivatives.

11. The method according to claim 9, further comprising adding a retarder comprising at least one of the components chosen in the list consisting of: gluconate salts, glucoheptonate salts, hydroxycarboxylic acids, hydroxycarboxylic salts, unrefined lignosulfonates, refined lignosulfonates and lignin amine derivatives.

12. The method according to claim 9, wherein the borates have the property of releasing polyborate anions.

13. The method according to claim 9, wherein the borates are comprised of alkali metal borates of the general formula $(B_2O_3)_y(N_2O)$, wherein N is an alkali metal.

14. The method according to claim 9, wherein the $B_2O_3:N_2O$ molar ratio is equal to or greater than 2.

15. The method according to claim 9, wherein the $B_2O_3:N_2O$ molar ratio is in the range of from 2 to 5.

16. The method according to claim 9, wherein the silicates are alkali metal silicates of the general formula $(SiO_2)_x(M_2O)$, wherein M is an alkali metal.

17. The method according to claim 16, wherein the $SiO_2:M_2O$ molar ratio is between 1.68 and 3.37.

18. The method according to claim 16, wherein the $SiO_2:M_2O$ molar ratio is greater than 1.5.

* * * * *